(12) United States Patent
Grott

(10) Patent No.: US 7,514,003 B2
(45) Date of Patent: Apr. 7, 2009

(54) METHODS FOR PRODUCING USEFUL WATER PRODUCTS WITH REDUCED SODIUM CONTENT

(76) Inventor: Gerald J. Grott, 5076 Leila La., Twentynine Palms, CA (US) 92277

( * ) Notice: Subject to any disclaimer, the term of this patent is extended or adjusted under 35 U.S.C. 154(b) by 508 days.

(21) Appl. No.: 11/081,576

(22) Filed: Mar. 16, 2005

(65) Prior Publication Data

US 2005/0210745 A1 Sep. 29, 2005

(51) Int. Cl.
*G21F 9/04* (2006.01)
(52) U.S. Cl. .................................................. 210/681
(58) Field of Classification Search ............... 210/676, 210/687, 681
See application file for complete search history.

(56) References Cited

U.S. PATENT DOCUMENTS

| 2,671,714 | A | * | 3/1954 | McIlhenny et al. | 423/157 |
| 2,897,051 | A | * | 7/1959 | McIlhenny et al. | 423/157 |
| 4,996,065 | A | * | 2/1991 | Van de Walle | 426/72 |
| 2003/0172697 | A1 | * | 9/2003 | Sower | 71/11 |

\* cited by examiner

*Primary Examiner*—Chester T Barry
(74) *Attorney, Agent, or Firm*—William H. Drummond

(57) ABSTRACT

The invention relates to a process for treating unwanted moderately saline waters for producing waters acceptable for treating soil, such as for irrigation. The treated water is also suitable for human and livestock consumption. The process includes passing moderately saline waters having 0.05% or more by weight and less than 1.00% by weight of the salts of Na, K, Ca, Mg, Fe, Cl, $SO_4$, or $CO_3$ or combinations thereof through an ion exchange resin. The ion exchange resin is pre-treated to be saturated with multivalent cations. Preferred multivalent cations include calcium ($Ca^{2+}$) or magnesium ($Mg^{2+}$) ions, or combinations thereof. After passing through the ion exchange resin, the effluent has decreased sodium cations and increased calcium and/or magnesium cations compared to the pre-treated moderately saline water. As the moderately saline waters passes through the ion exchange resin, the sodium content of the resin rises as the multivalent cation content lowers until the resin is unacceptable for further water treatment in accordance with the present invention. To regenerate the ion exchange resin, the resin is flushed with a brine solution having more than 1.00% by weight of the salts of Na, K, Ca, Mg, Fe, Cl, SO4, or CO3. Preferably, the brine is particularly high in calcium and/or magnesium content and low in sodium. The brine solution is flushed through the ion exchange resin until the ion exchange resin is sufficiently saturated with multivalent cations to again process moderately saline water having high sodium content.

1 Claim, 3 Drawing Sheets

The Water Hardening Process

METHODS FOR PRODUCING USEFUL WATER PRODUCTS WITH REDUCED SODIUM CONTENT

BACKGROUND OF THE INVENTION

The present invention relates to methods for water purification processing and the economic utilization of waste waters produced from water purification processing.

The disposal of saline water has become an expensive problem for society. For example, approximately 1.61 billion gallons of water containing approximately 800,000 tons of mixed sodium, calcium and magnesium chlorides and sulfates is produced from water treatment operations and oil fields in the state of California alone. This saline water must be disposed of, costing the state millions of dollars each year. Meanwhile, the United States Geological survey recently determined that New Mexico has an astounding 15 billion acre feet of brackish ground water, and a single basin in West Texas alone was found to have 760 million acre feet of brackish ground water.

Many coal beds are located where traditional mining is not feasible. Instead, the coal beds are stripped of their associated methane by pumping water from the coal bed strata. Methane migrates to gas wells where it is pumped out and transported for public use. The removed water is usually of moderate salinity, typically 900 to 1500 parts per million (ppm) of total dissolved salts (TDS). Unfortunately, the water is typically high in sodium and carbonate and/or bicarbonate.

Meanwhile, the disposal of waste water has become even more problematic in other parts of the world. As a result, billions of dollars are spent each year toward efforts to dispose of waste waters. Accordingly, it would be highly advantageous to provide improved methods of disposing of salty waters. It would even be more advantageous to provide methods of utilizing salty waters which provide a benefit to society, instead of simply disposing of the unwanted waters.

Water purification typically produces a first effluent of relatively "clean water" and a second effluent of "waste water" which includes unwanted contaminants. For purposes herein, clean water is defined to mean water including less than 0.05% by weight of the chloride, sulfate or carbonate salts of sodium, potassium, calcium or iron or combinations thereof. In addition to waste water, there is a substantial amount of "moderately saline water" around the world that has less salinity than waste water but which is not generally acceptable for irrigation or animal consumption. Thus, this moderately saline water has severely limited application and usefulness. As defined herein, "moderately saline water" means water that has 0.05% or more by weight and less than 1.00% by weight of the chloride, sulfate or carbonate salts of sodium, potassium, calcium or magnesium, or combinations thereof.

Known water purification processes proceed by numerous methods including ion-exchange, membrane softening, electrolysis, evaporation and precipitation. The softening of hard water take place by removing calcium and magnesium which is required for both industrial and household use. Known water softening processes proceed either by way of ion-exchange, membrane softening or precipitation. In the ion-exchange processes, the calcium ($Ca^{2+}$) and magnesium ($Mg^{2+}$) ions are exchanged for sodium ($Na^+$) and the regeneration of the ion-exchange resin is achieved with a large excess of NaCl. This process creates a regeneration effluent being a relatively concentrated aqueous solution of sodium, calcium and magnesium chlorides which has to be discarded. Consequently, by this method, considerable amounts of sodium, calcium and magnesium salts in solution must be disposed of.

Alternatively, it is possible to soften water by using weak acid resins which exchange hydrogen ($H^+$) for calcium ($Ca^{2+}$) and magnesium ($Mg^{2+}$), and to regenerate the spent resins with a mineral acid. While this method creates less waste water, it is more expensive and yields relatively acidic soft water which is corrosive. Meanwhile, membrane softening concentrates the calcium, magnesium salts and salts of other divalent ions to produce waste waters which require costly disposal.

The precipitation process has traditionally been carried out by the "lime soda" process in which lime is added to hard water to convert water soluble calcium bicarbonate into water insoluble calcium carbonate. This process also results in waste water which is difficult to filter and requires cumbersome treatment.

My previously issued patent, U.S. Pat. No. 5,300,123 relates to the purification of impure solid salts. Even this process produces salty waste water which must be disposed of. My later-issued patents U.S. Pat. Nos. 6,071,411 6,374,539 and 6,651,383 relate to the processing and utilization of processed waste waters. These processes preferably employ ion-exchange, preferably using sodium sulfate or calcium sulfate, to alter the salt content of treated water. Moreover, the resulting salts, clean effluents and waste water effluents are useful for various applications including the treatment of soils for improving dust control, soil stabilization, adjusting the soil's sodium adsorption ratio (SAR), and treating root rot.

Unfortunately, even with all of the various water treatment processes of the prior art, there are billions of gallons of waste water and moderately saline water that are discarded or not utilized because it is far too expensive to purify such waters using known water treatment processes. This overabundance of water is troubling because there is an overwhelming worldwide need for water, particularly for human and livestock consumption. A recent report from the United Nations states that more than 50 percent of the nations in the world will face water stress or water shortages by the year 2025. By 2050, as much as 75 percent of the worlds's population could face water scarcity.

Even more troubling, in impoverished countries humans and animals often suffer from calcium and magnesium deficiencies even though there may be millions of gallons of nearby saline waters. These saline waters typically contain some calcium and magnesium but are too high in sodium to be drinkable. Unfortunately, due to the expense and unavailability of equipment, this water cannot be processed for human or animal consumption.

Instead, milk is recommended to provide an adequate diet of calcium and magnesium but milk is typically not affordable or available in sufficient quantities to meet the needs of children in developing countries or even the needs of children in poor areas of developed countries. It would be an incredible development if the saline water could be treated to lower the sodium but increase or maintain the calcium and magnesium to levels suitable for human and livestock consumption.

Water is also in great demand for soil treatment, particularly for irrigation. Unfortunately, waste waters typically have saline content which is not suitable for nearby irrigation. Thus, it would be extraordinarily advantageous if an inexpensive process were developed for processing waste waters to produce an effluent suitable for irrigation.

Wind erosion of soil is also a significant problem throughout the world. Due to small particle size and poor cohesion, finely divided soil is sensitive to the influence of wind. Such finely divided soil is found in agricultural lands, dunes, lake beds, construction sites and roads under construction. Erosion by wind causes the drifting of masses of soil in the form of dust. The erosion by wind causes the inconvenience of dust formation and the loss of valuable matter such as seed, fertilizer and plantlets. Dust storms are a danger to traffic and a health risk to persons located in the vicinity.

Finally, it would be desirable if all of the aforementioned objectives could be accomplished while overcoming the expensive and problematic concerns facing this country and the rest of the world, specifically, the disposing of saline waters. It would further be desirable if this objective could be obtained while simultaneously meeting with above described needs.

SUMMARY OF THE INVENTION

Briefly, in accordance with the invention, I provide methods for economically and efficiently processing moderately saline waters, particularly those produced from oil and gas wells, and irrigation drainage, to produce an effluent containing lower sodium content but the increased salts of multivalent cations, particularly calcium and magnesium. I also provide methods for utilizing the effluent produced by water purification.

The process of the present invention provides for treating moderately saline water having 0.05% or more by weight of the salts of Na, K, Ca, Mg, Fe, Cl, $SO_4$, or $CO_3$ or combinations thereof and less than 1.00% by weight of the salts of Na, K, Ca, Mg, Fe, Cl, $SO_4$, or $CO_3$ or combinations thereof. The present invention is particularly suitable for treating water having high sodium content. The moderately saline water is then passed through an ion exchange resin saturated with multivalent cations to produce "useful water". As defined herein, the term "saturated" is interpreted in a loose sense to mean that the ion exchange resin has sufficient multivalent cations to effect an ion exchange for sodium to reduce the amount of sodium in moderately saline water.

Though the present process is not a water softening process, I have discovered that commercially available ion exchange resins sold for water softening may be utilized for the practice of the present invention. Moreover, though I have not discovered a preferred ion exchange resin, I have determined that a resin called Lewatit C-249 from Sybron Chemicals, a division of Bayer Chemicals, is acceptable. For practicing the water treatment process of the present invention, the ion exchange resin is saturated with multivalent cations. Various multivalent cations may be utilized. However, it is preferred that the multivalent cations are calcium ($Ca^{2+}$) or magnesium ($Mg^{2+}$) ions, or combinations thereof. Water softening resins are often sold saturated with sodium which is unacceptable for practicing the present invention. To saturate the resin with multivalent cations, calcium chloride or magnesium chloride solution may be utilized to flush the resin until the resin is sufficiently saturated with calcium and/or magnesium cations to effect an ion exchange for sodium.

The moderately saline water is passed through the ion exchange resin to produce a useful effluent having decreased sodium cations compared to the moderately saline water. The useful effluent will also have higher calcium and magnesium. However, I have determined that the useful effluent can be utilized for both human and animal consumption. Moreover, I have determined that the useful effluent is also beneficial for treating soil for irrigation.

As the moderately saline waters passes through the ion exchange resin, the sodium content of the resin rises and the multivalent cation content lowers until the resin is unacceptable for further water treatment in accordance with the present invention. To regenerate the ion exchange resin, the resin is flushed with a brine solution having more than 1.00% by weight of the salts of Na, K, Ca, Mg, Fe, Cl, $SO_4$, or $CO_3$. Preferably, the brine is particularly high in calcium and/or magnesium content and low in sodium. The brine solution is flushed through the ion exchange resin until the amount of multivalent cations affixed to the ion exchange resin is increased and the sodium affixed to the resin is decreased until the ion exchange resin is sufficiently saturated with multivalent cations to again process moderately saline water having high sodium content.

The recharge process increases the multivalent cations in the ion exchange resin. However, the effluent produced from the recharge process has a significantly high sodium content. Advantageously, I have discovered that the recharge effluent waters which have a high sodium content are particularly suitable for soil stabilization, pond sealing and treating root rot. These high sodium waste waters are also suitable for use in cooling towers and laundry applications.

I have learned that waters produced from water purification, particularly those high in calcium and magnesium can be used to control dust and to irrigate farm land, or as additive to irrigation waters where the soil has a high sodium content. Moreover, I have discovered that useful effluent and recharge effluent can be processed to create both solid and aqueous mixtures which can be applied to roads and highways for deicing.

Accordingly, it is an object of the invention to provide cost effective means of processing moderately saline waters.

It is a also principal object of the invention to provide new methods for utilizing the useful water produced from water purification.

These and other, further and more specific objects and advantages of the invention will be apparent to those skilled in the art from the following detailed description taken in conjunction with the drawings.

DETAILED DESCRIPTION OF THE PREFERRED EMBODIMENTS

The presence of calcium and/or magnesium in water results in the water being considered "hard". These mineral ions in the water react with heat, plumbing and other chemical agents to reduce the cleaning effectiveness of laundry, dish washing and bathing applications. These calcium and magnesium ions also combine with carbonates, sulfates, oils and fat to create bathtub scum, spotted dishes, gray sheets, etc. In addition, hard water has been found to cause scaling of industrial water heaters and commercial boilers causing early substantial energy losses through impaired heat transfer and early shutdown for the removal of scale. Accordingly, there has been substantial effort to remove the "hardness" of the water.

Figure 1:
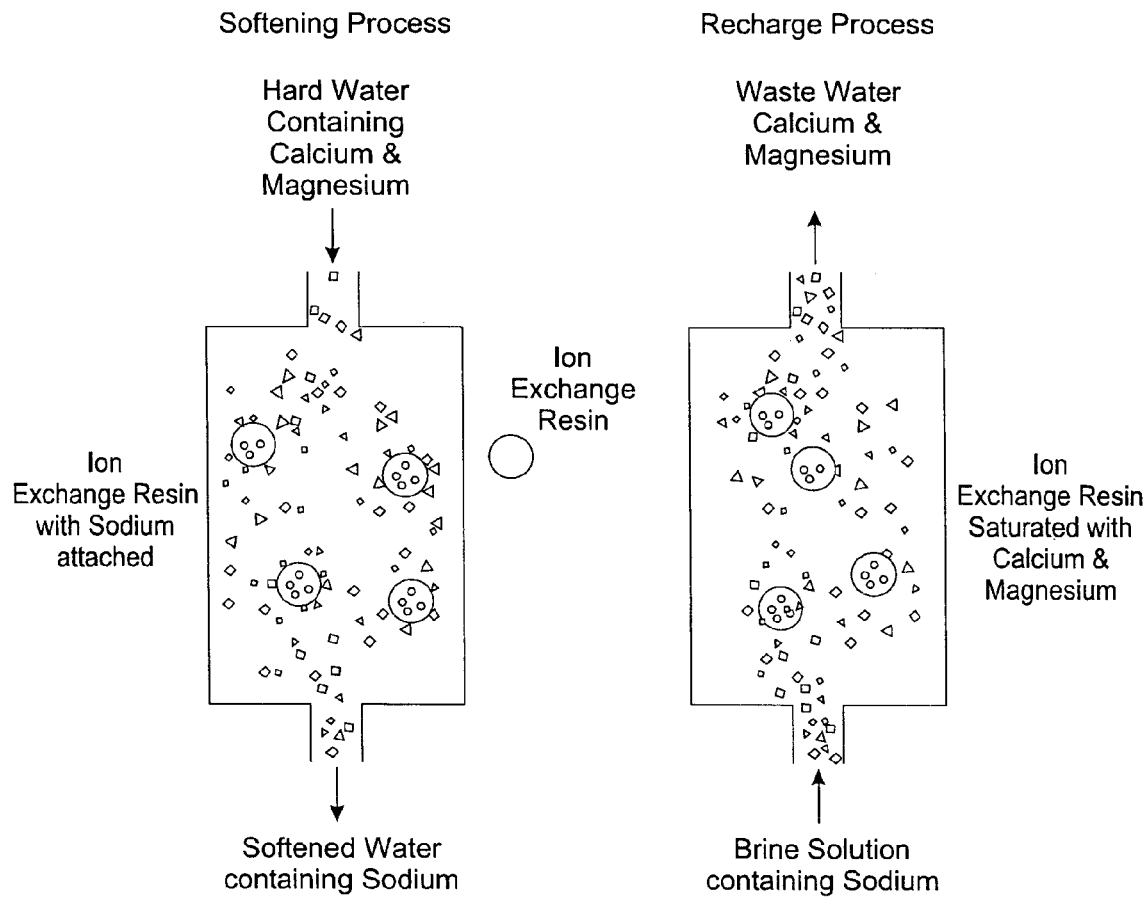
FIG. 1 is a flow chart illustrating the prior art process of water softening.

With reference to FIG. 1, water softening is the removal of the "hardness" from the water which means predominantly removing or altering the calcium and magnesium ions from the water. Several methods for effecting water softening are known. The best known process for softening water is "ion-exchange". The hard water passes through a tank containing an ion exchange resin, often containing beads which are microporous. The beads are saturated with sodium to cover both their exterior and interior surfaces. As the water passes through the resin, an ion exchange process occurs. Ion-exchange entails the exchange of sodium, which is introduced into the water from the resin, for calcium, magnesium, iron and other divalent mineral ions which are transferred out of the water and into a resin. Calcium and magnesium ions attach to the resin while the sodium on the resin is released into the water. When the resin approaches saturation with these hard ions, the resin is regenerated, most often with solutions of sodium chloride leaving an effluent containing 3 to 25% sodium, calcium and magnesium salts which must be disposed of. The exact concentration of the effluent depends on the shop practice and, in particular, on the amount of rinse water included in the effluent, if any. Less often mineral acids like sulfuric acid or hydrochloric acid are used for water softening.

Meanwhile, I have discovered that the reversal of the water softening process can be practiced to treat moderately salty waters, particularly waters high in sodium content, to produce "useful waters" having higher calcium and magnesium content but lower sodium content. Because the process results in increased calcium and magnesium in the water, the process can be referred to as a "water hardening" process.

Figure 2:
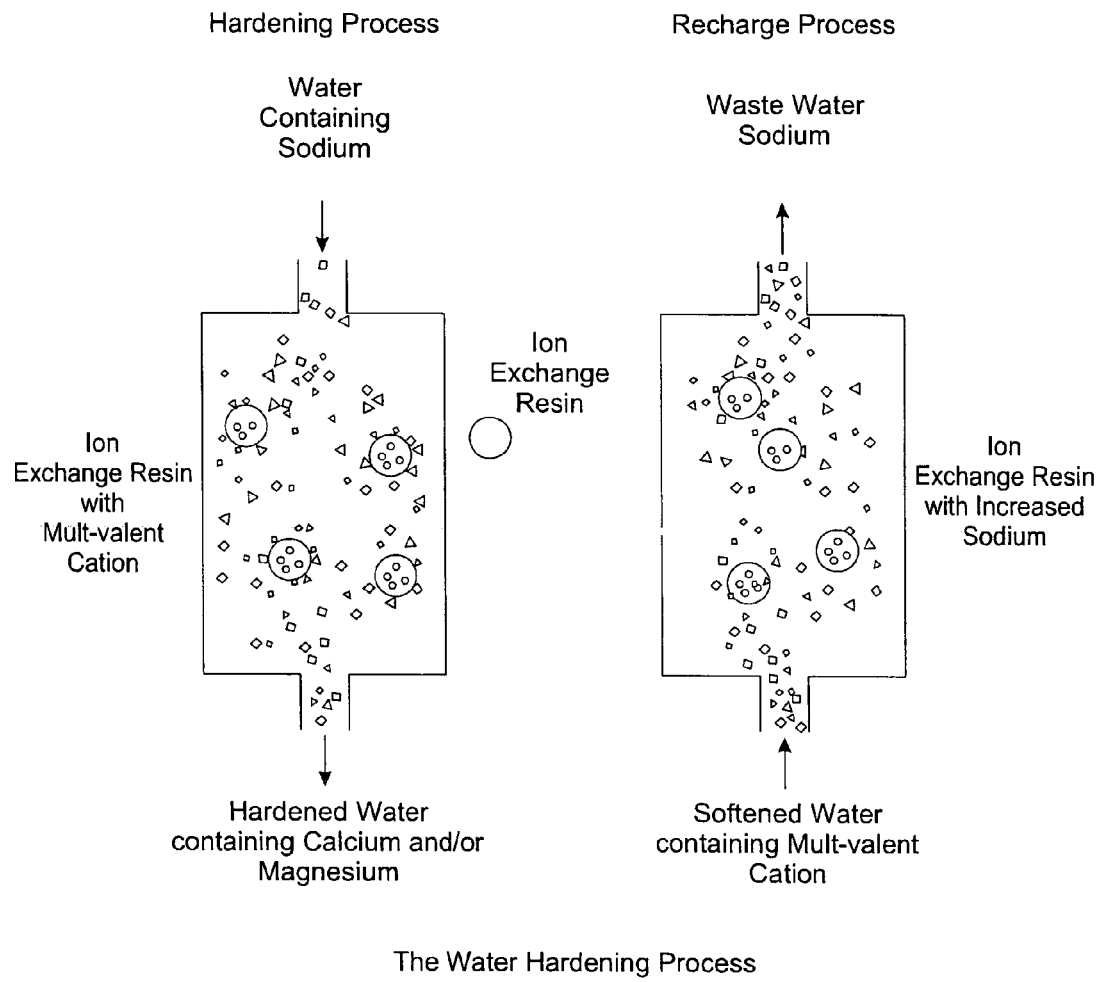
FIG. 2 is a flow chart illustrating the process of the present invention which produces water hardening.

With reference to FIG. 2, the process of the present invention passes the moderately saline waters through an ion exchange resin. The resin is pre-treated to be saturated with multivalent cations. Preferred multivalent cations include calcium ($Ca^{2+}$) or magnesium ($Mg^{2+}$) ions, or combinations thereof. The pretreatment can be achieved by various methods which can be selected by those skilled in the art. However, in a preferred embodiment, the resin may be pre-treated using a calcium chloride or magnesium chloride solution to flush the resin until it is properly saturated with calcium and/or magnesium cations. I have found that a resin of Lewatit C-249 from Sybron Chemicals can be generated using a 13% solution of calcium chloride flushed at a rate of 15 lbs of calcium chloride per cubic foot of resin.

The moderately saline water is passed through the ion exchange resin to produce a useful effluent having decreased sodium cations compared to the pre-treated moderately saline water. The useful effluent will also have higher calcium and magnesium. As the moderately saline waters passes through the ion exchange resin, the sodium content of the resin rises until the resin is unacceptable for further water treatment in accordance with the present invention. To regenerate the ion exchange resin, the resin is flushed with a brine solution having more than 1.00% by weight of the salts of Na, K, Ca, Mg, Fe, Cl, $SO_4$, or $CO_3$. Preferably, the brine is particularly high in multivalent cation content, such as calcium and/or magnesium, but low in sodium content. The brine solution is flushed through the ion exchange resin until the amount of multivalent cations affixed to ion exchange resin is increased and the sodium is decreased until the ion exchange resin is sufficiently saturated with multivalent cations to again process moderately saline water in accordance with the present invention.

In an additional preferred embodiment, the moderately saline water may be pre-treated using known water treatment techniques prior to undergoing the water "hardening" process of the present invention. For example, where the water has significant levels of calcium and magnesium, as well as sodium, the water is preferably processed through a known water softening process to remove as much calcium and magnesium as possible. Advantageously, the removal of the calcium, magnesium and other multivalent cations before the hardening treatment helps prevent the creation of precipitates which bind to membranes if membrane filtration is also utilized.

The method of treating water of the present invention will now be further explained in and by the following examples.

EXAMPLE 1

Moderately saline well water is pumped from the Wonder Valley area, east of Twenty Nine Palms, Calif. Water from the well is measured at 1960 ppm TDS and water analysis reveals the following results.

| Pre-Treated Moderately Saline Water | |
| --- | --- |
| Cations | Results (ppm) |
| Calcium | 51 |
| Magnesium | Not detected |
| Sodium | 700 |

Figure 3:
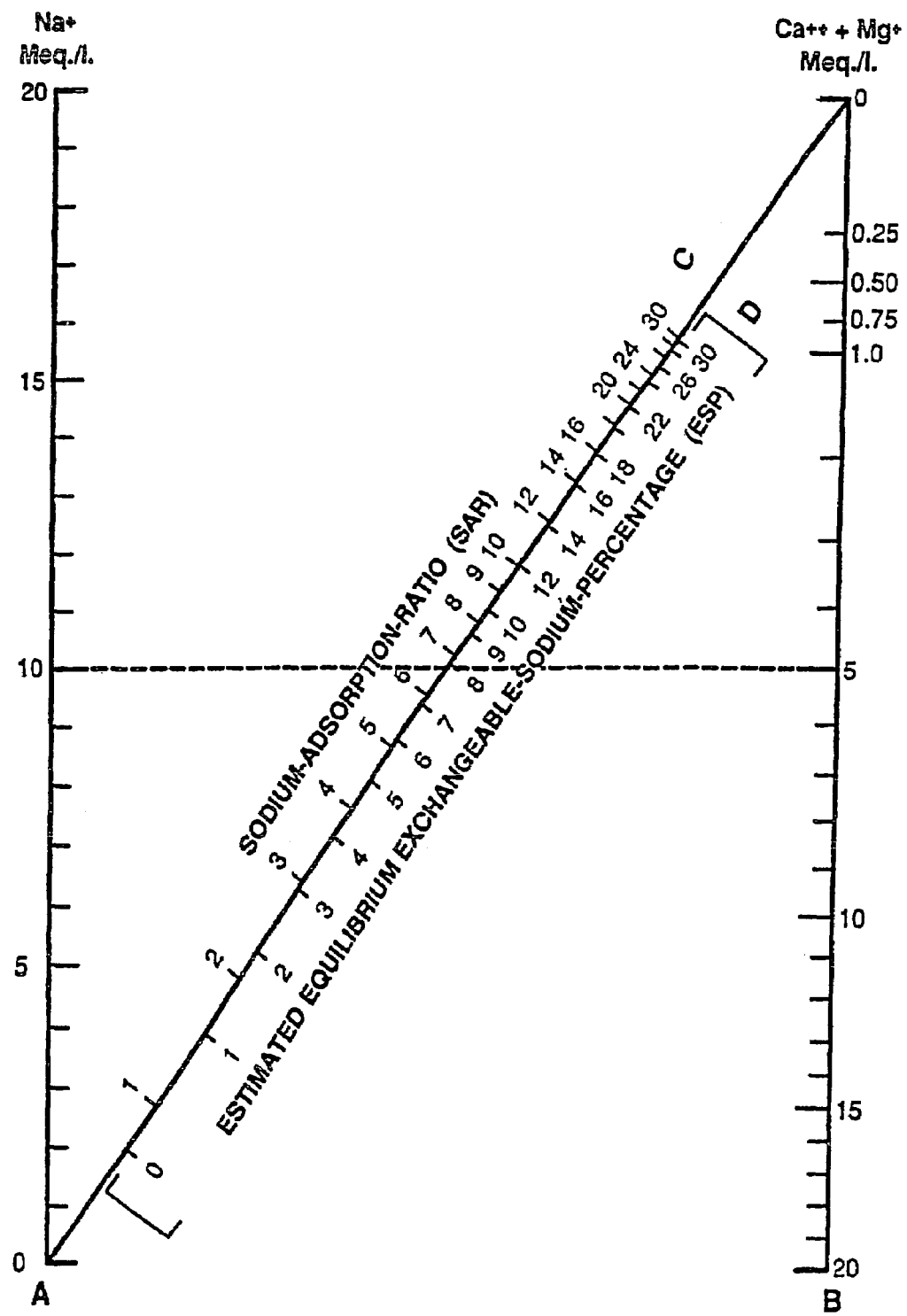
FIG. 3 is a chart illustrating the sodium absorption ratio (SAR) of irrigation waters.

Using the chart of FIG. 3 reveals that the water has an SAR value of 29.

The well water is hardened by passing it through an ion exchange resin of Lewatit C-249 from Sybron Chemicals which has been saturated with calcium cation using a 13% solution of calcium chloride flushed at a rate of 15 lbs of calcium chloride per cubic foot of resin. After treatment, water analysis reveals the following results.

| Post-Treated "Useful" Water | |
| --- | --- |
| Cations | Results (ppm) |
| Calcium | 410 |
| Magnesium | 1.4 |
| Sodium | 380 |

Using the chart of FIG. 3 reveals that the water now has an SAR value of 5.0.

EXAMPLE 2

Moderately saline well water is pumped from Red Rock Ranch, Calif. from the Department of Water Reclamation ("DWR"). The water is initially measured to have 5600 ppm TDS and water analysis reveals the following results.

| Pre-Treated Moderately Saline Water | |
| --- | --- |
| Cations | Results (ppm) |
| Calcium | 530 |
| Magnesium | 110 |
| Sodium | 1400 |

Because the chart of FIG. 3 cannot be used to reveal SAR value of the water, numerical calculations are performed to determine that the SAR is approximately 15.2.

As a result of its high initial calcium and magnesium levels, it is decided that the DWR water will undergo both a water softening process and a water hardening process. The water is treated through a water softening process to lower the calcium and magnesium levels to below 5 ppm as reflected in the following results.

| Moderately Saline Water After Water Softening | |
|---|---|
| Cations | Results (ppm) |
| Calcium | Not detected |
| Magnesium | Not detected |
| Sodium | 2200 |

The extremely high sodium level and low calcium and magnesium levels results in an "off-the-chart" SAR level.

The DWR water is then hardened by passing it through an ion exchange resin of Lewatit C-249 from Sybron Chemicals which has been saturated with calcium cation using a 13% solution of calcium chloride flushed at a rate of 15 lbs of calcium chloride per cubic foot of resin. After treatment, water analysis reveals the following results.

| Post-Treated "Useful" Water | |
|---|---|
| Cations | Results (ppm) |
| Calcium | 940 |
| Magnesium | 2.3 |
| Sodium | 1100 |

Using the chart of FIG. 3 reveals that the water now has an SAR value of 4.9.

Irrigation With "Hardened" Waters

All irrigated areas suffer from a buildup of sodium. Plant evapotranspiration and plant growth use about 70 to 90% of the irrigation water and the sodium is concentrated in the remaining 10 to 30% of the water. This water must be washed from the roots or plant growth suffers.

Calcium and Magnesium have very little affinity for water while sodium has a very strong affinity for water. Sodium's affinity for water is strong enough to spread clay particles, and clays are said to "swell". The more sodium ions in soil water, as compared to the concentration of calcium and magnesium ions, the higher the percentage of the ion exchange sites that will be occupied by sodium. This causes a greater attraction of water and the soils swell more. However, experimentation has found that there is a stopping point to the soil swelling. When about 14-16% of the change sites are occupied by sodium ions, the clay particles disperse into small units and the swelling is lost and the soil packs tightly. The clay particles plug most of the pores that remain in the soil and this further restricts the movement of air, water and nutrients and the soil's productivity is lost. U.S. Salinities Laboratory calculated the amount of ion exchange sites that would be occupied by sodium based on the amount of calcium and magnesium present. These calculations were named the Sodium Adsorption Ration (SAR).

As shown in FIG. 3, the sodium buildup is predicted by the sodium absorption ratio (SAR) vs. the total salinity of the irrigation water. To use the chart in FIG. 3, the sodium concentration is marked on the left side of the nomogram. The calcium plus magnesium concentration is then marked on the right side of the nomogram. Drawing a straight line between the two marks identifies the SAR value where the line intersects the sodium adsorption scale. Due to the inverse relationship between the addition of sodium to calcium and magnesium, an increase in calcium and/or magnesium will actually lower the SAR value of the irrigation water. Though some plants are much more tolerant of high sodium content in the soil, generally a SAR value of 14 or more will cause a dispersion of the clay content within the soil and a corresponding loss in productivity.

With reference to Examples 1 and 2, the moderately saline waters are tested and determined to have SAR values of 29 and 15.2, respectively. Clearly, use of these waters for irrigation would have a harmful impact on soil productivity. However, after the hardening process of the present invention, the waters are found to have SAR values of 5.0 and 4.9, respectively, which are much more conducive for irrigation. By using the waters having an increased calcium and magnesium content as irrigation water reduces the buildup of exchangeable sodium in the soil thereby maintaining the soil in proper sodium equilibrium. Moreover, the process produces water which will optimize the SAR of soil moisture in the root zone of plants while decreasing the soil's salinity. This decrease in salinity is particularly advantageous because the prior art practices of adding calcium and magnesium salts or sulfuric acids causes an undesirable increase in soil salinity.

Animal Consumption of "Hardened" Waters

While the U.S. Environmental Protection Agency ("EPA") recommends that the salt content of drinking water for humans be limited to 500 ppm TDS, for most animals such as livestock, 1000 to 1500 ppm is tolerable. Moreover, the less sodium in the water, causes a corresponding increase in the total salt content that is tolerable to both humans and livestock.

Meanwhile, whole milk has much higher salt content than approved drinking water. The average concentrations of milk salt constituents is listed as follows.

| Whole Milk | |
|---|---|
| Constituent | Results (ppm) |
| Calcium | 1230 |
| Magnesium | 120 |
| Sodium | 580 |

As a result of diets in many parts of the world, children are very deficient in calcium and/or magnesium. For many children, milk is not available. In addition to children, animals such as livestock are also in need of water, calcium and/or magnesium. Thus, it would be desirable if the drinking water supply in impoverished areas could provide the calcium and/or magnesium where milk is unavailable or unaffordable.

With reference to Examples 1 and 2, water processing of the present invention produces water having salt contents comparable to whole milk. Moreover, the saline waters of Examples 1 and 2 contain TDS significantly higher than billions of gallons of moderately saline waters across world. Processing of the moderately saline waters in accordance with the practice of the present invention would produce waters having even lower salt contents.

In many areas of the world, the only water supplies available are saline. However, the water can be improved upon by lowering the sodium while increasing the calcium and/or magnesium content by processing the available saline water in accordance with the process of the present invention.

Other Uses For "Hardened" Waters

In addition to use the water for human and livestock consumption, the useful effluent produced by practicing the hardening process of my invention can be utilized for various purposes. For example, I have learned that the waters produced from my water purification process, particularly those waters high in calcium and magnesium can be used to control dust. Moreover, I have discovered that useful effluent waters can be processed to create both solid and aqueous mixtures which can be applied to roads and highways for deicing.

The recharge process increases the multivalent cations in the ion exchange resin. However, the effluent produced from the recharge process has a very high sodium content. Advantageously, I have discovered that the recharge effluent waters which have a high sodium content are particularly suitable for soil stabilization, pond sealing and treating root rot. These high sodium waste waters are also suitable for use in cooling towers and laundry applications.

Having described the invention in such terms as to enable one skilled in the art to make and use it and having identified the presently best mode of practicing it,

I claim:

1. A process for treating a waste water stream, to produce a useful water product said waste water stream comprising brackish ground waters, moderately saline water or waste from water purification processing, and containing less than about one percent by weight of dissolved salts of sodium, potassium, magnesium and/or calcium, said useful water product having reduced dissolved sodium and/or potassium content and increased dissolved magnesium and/or calcium content in comparison to said waste water stream, said process comprising the steps of:

contacting said waste water stream with a cation exchange resin loaded with magnesium and/or calcium ions, to reduce the dissolved sodium and/or potassium ion content and increase the dissolved magnesium and/or calcium content thereof, and separating said useful water product from said ion exchange resin.

* * * * *